US008085973B2

(12) United States Patent
Dirsch et al.

(10) Patent No.: US 8,085,973 B2

(45) Date of Patent: Dec. 27, 2011

(54) METHOD AND DEVICE FOR THE DETECTION, AT THE CORRECT TIME, OF PRINT MARKS LOCATED AT REGULAR INTERVALS ON A PRINT WEB

(75) Inventors: Bernhard Dirsch, Erlangen (DE); Jörg Reh, Möhrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 786 days.

(21) Appl. No.: 12/224,521

(22) PCT Filed: Jan. 17, 2007

(86) PCT No.: PCT/EP2007/050424

§ 371 (c)(1), (2), (4) Date: Aug. 28, 2008

(87) PCT Pub. No.: WO2007/098984

PCT Pub. Date: Sep. 7, 2007

(65) Prior Publication Data

US 2009/0041296 A1 Feb. 12, 2009

(30) Foreign Application Priority Data

Mar. 1, 2006 (DE) ........................ 10 2006 009 434

(51) Int. Cl.
*G06K 9/00* (2006.01)
*G03B 27/14* (2006.01)

(52) U.S. Cl. ...................................... 382/100; 355/112

(58) Field of Classification Search .................. 382/100, 382/112, 145, 175, 184, 287; 347/110, 148, 347/154, 224; 355/78, 90, 112; 358/1.4, 358/526
See application file for complete search history.

(56) References Cited

U.S. PATENT DOCUMENTS

| | | | | |
|---|---|---|---|---|
| 5,142,139 | A * | 8/1992 | Hayashi et al. | 250/208.1 |
| 6,108,436 | A * | 8/2000 | Jansen et al. | 382/112 |

FOREIGN PATENT DOCUMENTS

| | | | |
|---|---|---|---|
| DE | 101 17 454 | A1 | 10/2002 |
| EP | 0 882 588 | A1 | 12/1998 |
| EP | 1 266 756 | A2 | 12/2002 |
| EP | 1 619 026 | A2 | 1/2006 |
| WO | WO 02/081220 | A1 | 10/2002 |
| WO | WO 2004/094146 | A1 | 11/2004 |

* cited by examiner

*Primary Examiner* — Abolfazl Tabatabai

(57) ABSTRACT

In a method and a device for the detection, at the correct time, of pressure marks situated at regular intervals on a print web, use is made of cameras, with a processing unit which is assigned to the camera. The activation of the camera is no longer triggered externally in order to detect the pressure marks. Instead, the drive control system, which actuates a movement of the print web, is connected to a bus to which the cameras and therefore the processing units are also connected. It is thereby possible for the drive control system to provide the processing units with process data which the processing units can use to calculate detection times. The activation of the camera takes place, on the basis of the calculation, automatically by means of the cameras with the processing unit itself.

7 Claims, 1 Drawing Sheet

METHOD AND DEVICE FOR THE DETECTION, AT THE CORRECT TIME, OF PRINT MARKS LOCATED AT REGULAR INTERVALS ON A PRINT WEB

CROSS REFERENCE TO RELATED APPLICATIONS

This application is the U.S. National Stage of International Application No. PCT/EP2007/050424, filed Jan. 17, 2007 and claims the benefit thereof. The International Application claims the benefits of German application No. 10 2006 009 434.4 filed Mar. 1, 2006, both of the applications are incorporated by reference herein in their entirety.

FIELD OF INVENTION

The invention relates to a method and device for the detection, at the correct time, of print marks located at regular intervals on a print web.

BACKGROUND OF THE INVENTION

Print marks are deployed as part of a register control process. The colors of the individual printing mechanisms are to be printed in the correct position in relation to one another. The print mark represents additional information, which is printed onto the material and serves only for control purposes. As well as being deployed for color register control, the print mark also serves for correct positioning during cutting (cut register control).

Naturally there also has to be a system, which detects and evaluates the printed print marks. Cameras are generally used for this purpose in modern register control systems. If it can be ensured that the camera photographs the print mark in a predefined region of its detection field, the detection time, i.e. the time when the camera is activated, can be related in a defined manner to the position of the print mark, thereby allowing control of the subsequent steps of printing further colors or even cutting.

For detection at the correct time, it is therefore initially essential for the print mark generally to be in the image range of the camera. Generally one print mark is located in the region of 1 m of print web. In contrast an image range of the camera is 60 mm in height. It is therefore imperative that the camera detects the print mark. The additional requirement that the camera should detect the print mark as centrally as possible is of no less importance.

In the prior art the camera is activated by way of a trigger system. Either the drive system, which controls the movement of the print web (i.e. the movement of the motors of the print cylinders transporting the print web), emits trigger signals directly and these are converted by the cameras or the drive system emits pulse generator signals, from which a trigger signal is derived in a separate unit.

The units generating the trigger signals are hereby generally relatively far away from the cameras for technical reasons. The signals therefore have to be routed over long distances at the machine. As these are time-critical signals, interference signal injection can cause incorrect activation of the camera system. Such interference originates particularly frequently from pulsed converters. Since the cables are laid by operators who frequently do not have adequate training, interference signal injection results to a significant degree in real systems.

EP 1 619 026 A2 discloses triggering an image recording unit by means of a control unit, namely as a function of a lead axle position of a lead axle defined in a printing machine. To allow this, the control unit communicates with at least one drive control system arranged downstream thereof of at least one group of pressure marks of the printing machine or also with a special processing and data processing unit.

SUMMARY OF INVENTION

The object of the invention is to allow detection of print marks at the correct time, providing better protection against interference signals, interference signal injection, etc. of all types.

The object is achieved by a method as claimed in the claims.

With the inventive method first of all at least one camera is provided with a processing unit assigned to the camera. Such cameras with processing units are known in the prior art. The processing unit assigned to the camera primarily has one central task. Specifically process data from a drive control system, which controls movement of the print web, is fed continuously to the processing unit. The received process data is used correspondingly to calculate detection times for the camera. The inventive method comprises two stages: in a first stage it is generally ensured that the print mark is shown on the camera image. In a second stage respective detection times are calculated, these being selected so that the print mark is shown centered (or another position criterion is met, for example that it is always shown bottom right, etc).

Accordingly in the inventive method a number of initial detection times is first calculated (determined) by the processing unit based on the supplied process data, the initial detection times being coordinated with one another in such a manner that a print mark is shown on at least one image recorded at one of the initial detection times using the camera. Theoretically it is possible for a camera to record one image after the other and thus to photograph the entire print web. However the cameras are frequently not sufficiently fast to do this, with the result that the camera can only record four images during one rotation of the print cylinder transporting the print web, while the entire print web would require sixteen images. The initial detection times can be selected so that first partial image 1, 5, 9 and 13 of the first print web meter is photographed, then partial image 2, 6, 10 and 14 of the second print web meter, then partial image 3, 7, 11 and 15 of the third print web meter and then partial image 4, 8, 12 and 16 of the fourth print web meter. The print mark is generally located on one of the partial images in each print web meter, i.e. on one image per rotation of the print cylinder, so that after four passes in the above-mentioned manner one print mark has been detected at some time, from which the processing unit is then able to conclude the positions of the other print marks.

The method also includes the activation of the camera at the initial detection times to record images and the evaluation of the recorded images by searching for a print mark on the images. Initialization data is obtained by the processing unit as part of the evaluation. The initialization data is simply an assignment of the information to the supplied process data by way of the print mark found. In other words the system "knows" from the initialization data where a print mark should be found on the print cylinder in each instance.

After obtaining this information by way of the assignment (initialization data) it is possible to control pass detection times, in other words to control camera activation. The print mark should be shown in the most centered manner possible on the respective images during this control. The inventive method starts this control with the processing unit calculating a first pass detection time based on the initialization data and the supplied process data, thus ensuring that a print mark is shown on an image recorded using the camera at the first pass detection time. The camera is activated at the first pass detection time and an image is recorded. This image serves as a basis for the control. Generally one image is used respectively for the control but a number of images can also be taken into account (progressively) during the control. The following steps are therefore repeated for the control: evaluation of the last recorded image and determination of a correction value for a next pass detection time by the processing unit, calculation of a next pass detection time based on the initialization data and the supplied process data by the processing unit and correction of the next pass detection time by the processing unit with the aid of the correction value arid activation of the camera at the respective next pass detection time to record an image of a print mark. In other words use is made as before of the continuously fed process data for the control as well as the initialization data (in other words the assignment of the data to the initially recorded images). This ensures that a print mark is shown. The correction serves to center the print mark in the image.

The invention therefore firstly uses a processing unit, which is assigned to the camera, which does not require an external trigger signal but calculates the detection times, in other words the activation times for the camera, itself.

The invention therefore firstly uses a processing unit, which is assigned to the camera, which does not require an external trigger signal but calculates the detection times, in other words the activation times for the camera, itself.

In one preferred embodiment the processing unit is integrated in the camera housing. This may be standard and this embodiment represents a particularly compact embodiment.

Since the register control can comprise a number of steps, for example when printing different colors, a number of cameras can also be provided accordingly. A processing unit is assigned to each camera. The initial detection times and the pass detection times, as mentioned above, are hereby respectively determined by the respective processing unit individually for the assigned camera. The cameras therefore do not have to function synchronously.

As mentioned above, the respective correction value is determined during the evaluation (of the images) based on a deviation of the print mark shown from a centered position.

Since the supply of process data is central to the present invention, the following should also be mentioned here: the process data can include data relating to the speed of the print web. The speed of the print web is in particular equal to the speed of a print cylinder transporting the print web. The formulation “data relating to the speed” is intended to mean that a numerical value for the speed does not necessarily have to be available in a predetermined speed unit. Instead a relative value is sufficient, for example a numerical value between 0 and 1, which is understood accordingly by the processing unit assigned to the camera.

The process data can also include data relating to the position of a print cylinder transporting the print web and/or its acceleration and/or a printed page format. This can be so in particular in addition to the data relating to the speed of the print web. The drive control system belonging to the inventive device does not have to be modified in this process in contrast to the prior art. Process data of the type mentioned above is available in conventional drive control systems, said data being either measured data from sensors or data, which is related to control of the print cylinder motors, for example if a specific control current is related to the speed in a predefined manner. It is important that process data is understood to mean the outputting of numerical values, which can be used by the processing unit to calculate detection times.

BRIEF DESCRIPTION OF THE DRAWINGS

A preferred embodiment of the invention is set out below with reference to the drawings, in which.

DETAILED DESCRIPTION OF INVENTION

Figure 1:
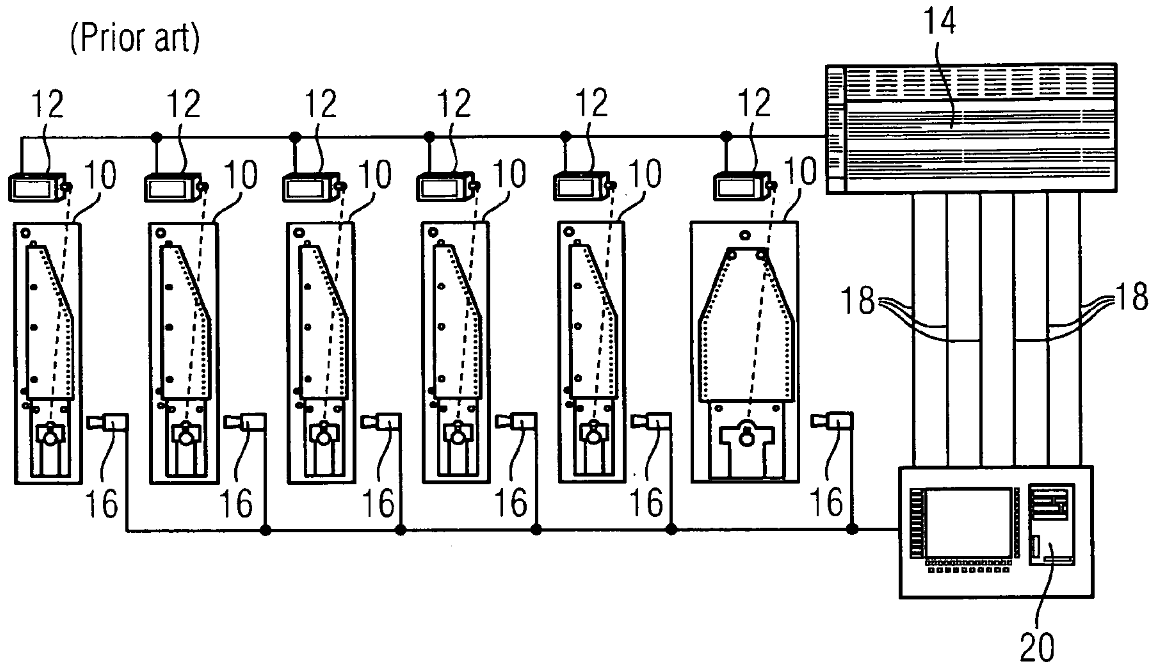
FIG 1 (Prior art)
FIG. 1 shows a printing machine arrangement with a device for the detection of print marks at the correct time according to the prior art and FIG. 2 shows an inventive device for the detection of print marks at the correct time.
Figure 2:
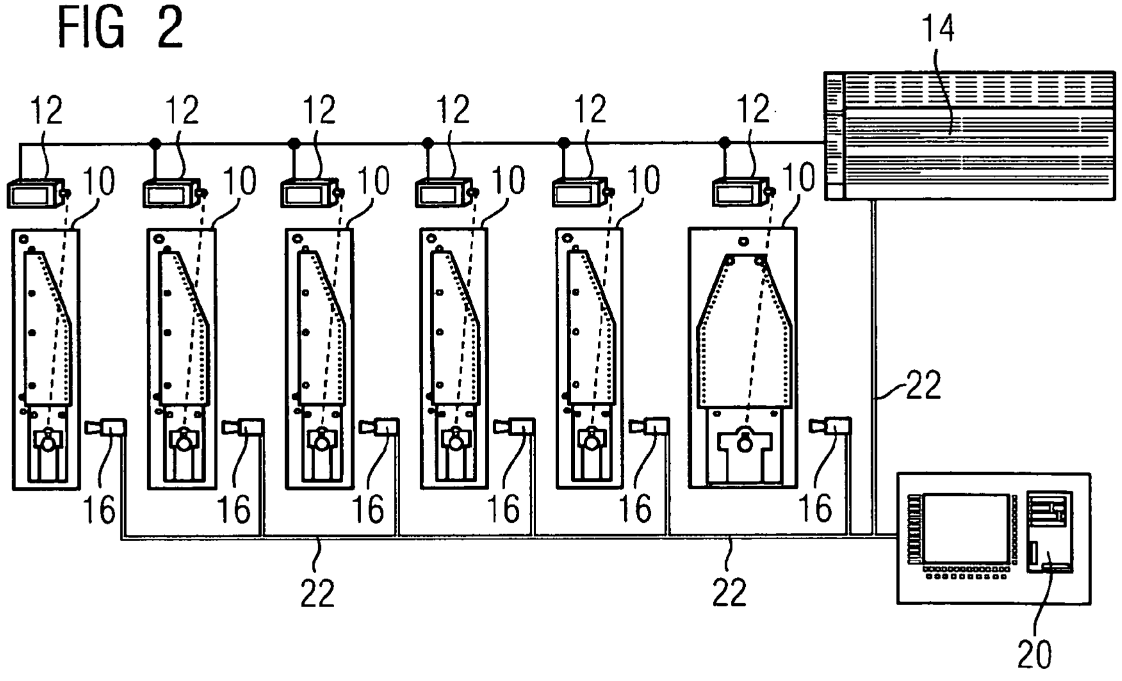

FIGS. 1 and 2 show a symbolic representation of a rotary press with six printing mechanisms 10, the print web not being shown in a continuous manner. Associated with each printing mechanism 10 is a print cylinder (not shown), which is rotated by a motor 12, which is shown separately in FIGS. 1 and 2. The motors 12 are controlled by a drive control system 14, each via their own cable. For the sake of clarity, a single common cable is shown in the figures.

Each printing mechanism 10 is assigned its own camera 16. In the prior art shown in FIG. 1 activation of the camera is triggered externally. Each camera 16 is hereby assigned a cable 18. The drive control system 14 generates trigger signals directly, these being fed to a register control unit 20 and being fed from this to the individual cameras 16. Alternatively the drive control system 14 generates pulse generator signals, which are supplied via the cables 18 to the register control unit 20, which then generates the trigger signals for the individual cameras 16. Interference signal injection can result in the region of the cables 18.

The invention prevents this in that there is no need for trigger signals. The drive control system 14 is connected to a common bus 22, as is each individual camera 16, in the invention shown in FIG. 2. The individual cameras 16 receive process data from the drive control system 14 by way of the common bus 22. The process data is data of the same type, as is used to control the motors 12 or as is received as response signals from the motors 12 by the drive control system 14. There is therefore no need for data conversion in the drive control system 14, but this latter can output data, which it has anyway, to the bus 22. The individual cameras 16 are respectively provided with a processing unit in the camera housing (not shown).

The register control unit 20 is likewise connected to the bus 22 but is only optional. It can supplement the individual processing units for example.

The process data determined via the bus 22 can include data relating to the position, speed, acceleration of the print web (of the print cylinders) and the production parameters (page format or print length).

Based on the data transmitted from the drive control system 14 to the cameras 16 the assigned processing unit can work out a strategy in each individual camera 16, to determine how it is initially determined where the print marks are located. Based on the rotation of the print cylinders the processing unit develops a strategy to determine when the camera records images (initial detection times are determined) and a sequence of images is recorded detecting the various print web positions without a gap (optionally corresponding points on the print web for a number of rotations of the print cylinder), so that a print mark is detected at some point. The processing unit in the cameras 16 evaluates all the images and generates a data record (initialization data), which can then be used to calculate the position of the print mark as a function of the process data (for example the position of the print cylinder). The actual control process can now start based on the initial assignment of detection times and process data. Detection times can be calculated for the individual cameras 16 by the respective processing units, it being still ensured based on the prior assignment and then taking into account measurement accuracy that the camera actually records a print mark. This is then controlled more specifically by the processing unit 16. The calculated detection times can be corrected by means of a correction value, if the print mark was not centered precisely in a previous image. This means that the print mark is recorded again, this time centered, in a subsequent image.

The step, which is only shown small in the figure (compare FIG. 1 with FIG. 2), of coupling the drive control system 14 to the common bus 22, to which the cameras 16 are also connected, first means that there is no need for triggering with the invention. Instead the processing units in the cameras 16 are designed to process process data from the drive control system 14 directly. The cameras carry out their activation operations to a certain degree independently based on this data.

The invention claimed is:

1. A method for the detection, at the correct time, of print marks located at regular intervals on a print web, comprising:

providing a camera with a processing unit assigned to the camera;

continuously feeding process data from a drive control system to the processing unit, wherein the drive control system controls a movement of the print web;

calculating a plurality of initial detection times based on the supplied process data, where the initial detection times are coordinated with one another such that a print mark is shown on at least one image recorded at one of the initial detection times using the camera;

activating the camera at the initial detection times to record images;

evaluating the recorded images by searching for a print mark on the images and obtaining initialization data by the processing unit;

calculating a first pass detection time based on the initialization data and the supplied process data by the processing unit such that a print mark is shown on an image recorded at the first pass detection time using the camera;

activating the camera at a first pass detection time to record an image; and subsequently repeating the following steps:

evaluating at least the last recorded image in each instance and determining a correction value for a next pass detection time by the processing unit, calculating a next pass detection time based on the initialization data and the supplied process data by the processing unit and correction of the next pass detection time with the aid of the correction value by the processing unit, activating the camera at the respective next pass detection time to record an image with a print mark.

2. The method as claimed in claim 1, wherein the processing unit is integrated in a housing of the camera.

3. The method as claimed in claim 2, wherein a plurality of cameras are provided, each assigned a processing unit, the respective processing unit determining the initial detection times and the pass detection times individually for the assigned camera.

4. The method as claimed in claim 3, wherein the respective correction value is determined when evaluating the images based on the deviation of the print mark shown from a centered position.

5. The method as claimed in claim 4, wherein the continuously supplied process data includes data relating to the speed of the print web.

6. The method as claimed in claim 5, wherein the continuously supplied process data includes data relating to the speed of a print cylinder transporting the print web.

7. The method as claimed in claim 6, wherein the continuously supplied process data further includes data relating to the position of a print cylinder transporting the print web and/or its acceleration and/or a printed page format.

* * * * *